United States Patent
Molinari et al.

(10) Patent No.: US 11,790,530 B2
(45) Date of Patent: Oct. 17, 2023

(54) SYSTEM FOR PROCESSING AN IMAGE RELATING TO A HISTOLOGICAL TISSUE

(71) Applicant: POLITECNICO DI TORINO, Turin (IT)

(72) Inventors: Filippo Molinari, Turin (IT); Massimo Salvi, Turin (IT); Nicola Michielli, Turin (IT)

(73) Assignee: POLITECNICO DI TORINO, Turin (IT)

( * ) Notice: Subject to any disclaimer, the term of this patent is extended or adjusted under 35 U.S.C. 154(b) by 60 days.

(21) Appl. No.: 17/911,433

(22) PCT Filed: Mar. 15, 2021

(86) PCT No.: PCT/IB2021/052119
§ 371 (c)(1),
(2) Date: Sep. 14, 2022

(87) PCT Pub. No.: WO2021/191723
PCT Pub. Date: Sep. 30, 2021

(65) Prior Publication Data
US 2023/0113608 A1 Apr. 13, 2023

(30) Foreign Application Priority Data
Mar. 24, 2020 (IT) .......................... 102020000006148

(51) Int. Cl.
*G06T 7/11* (2017.01)
*G06T 7/90* (2017.01)

(52) U.S. Cl.
CPC ... *G06T 7/11* (2017.01); *G06T 7/90* (2017.01); G06T 2207/10056 (2013.01); G06T 2207/30024 (2013.01)

(58) Field of Classification Search
CPC .... G06T 7/11; G06T 7/90; G06T 2207/10056; G06T 2207/30024
See application file for complete search history.

(56) References Cited

U.S. PATENT DOCUMENTS

2008/0019574 A1* 1/2008 Scalise et al. ........... G06T 7/11
382/282
2016/0314567 A1* 10/2016 Agaian et al. ........... G06T 7/90
(Continued)

FOREIGN PATENT DOCUMENTS

WO 2019229556 A1 12/2019

OTHER PUBLICATIONS

Savi et al. ("Multi-tissue and multi-scale approach for nuclei segmentation in H&E stained images," BioMedical Engineering OnLine, Volume 17, No. 89 (2018)) (Year: 2018).*
(Continued)

*Primary Examiner* — Yubin Hung
(74) *Attorney, Agent, or Firm* — Bayramoglu Law Offices LLC

(57) ABSTRACT

Method of processing a digital image relating to a histological tissue, to vary a color by forcing it towards a target average color of a digital reference image. The method includes a segmentation of the image regions that express a hue in a neighborhood of the hue of a comparison color and the calculation of an average coloration of the segmented area and if this average coloration differs under a predetermined threshold from the comparison color, then calculation and application of a corrective factor for each point of the image that expresses a hue around the hue of the average color, if instead the average color deviates beyond the predetermined one threshold from the comparison staining, then (Step 5) the average staining is set as the comparison staining and the segmentation is resumed from (Step 2).

16 Claims, 1 Drawing Sheet

(56) References Cited

U.S. PATENT DOCUMENTS

2021/0295994 A1* 9/2021 Papandreou et al. ... G06T 5/009

OTHER PUBLICATIONS

Abe et al. ("Color correction of pathological images for different staining-condition slides," Proceedings 6th International Workshop on Enterprise Networking and Computing in Healthcare Industry; Date of Conference: Jun. 29, 2004) (Year: 2004).*
Basavanhally et al. ("Em-based segmentation-driven color standardization of digitized histopathology," Proc SPIE, 8676 (2013)) (Year: 2013).*
Belsare ("Histopathological image analysis using image processing techniques: an overview," Signal Image Process., 3 (2012)) (Year: 2012).*
Erik Reinhard, et al., Color Transfer between Images, IEEE Computer Graphics and Applications, 2001, pp.34-41.
Gurcan et al. ("Histopathological image analysis: a review," IEEE Rev Biomed Eng, 2 (2009)) (Year: 2009).*
Macenko et al. ("A method for normalizing histology slides for quantitative analysis," IEEE Int. Symp. Biomed. Imaging From Nano to Macro (2009)) (Year: 2009).*
Magee et al. ("Colour normalisation in digital histopathology images," Proc. optical tissue image analysis in microscopy, histopathology and endoscopy (MICCAI Workshop), 2009) (Year: 2009).*
Mark D. Zarella, et al., An alternative reference space for H&E color normalization, PLOS ONE, 2017, pp.1-14, Vol.12, No.3.
Vahadane et al. ("Structure-Preserving color normalization and sparse stain separation for histological images," IEEE Trans. Med. Imaging, 35 (2016)) (Year: 2016).*
Vicory et al. ("Appearance normalization of histology slides," Computerized Medical Imaging and Graphics, Volume 43, Jul. 2015) (Year: 2015).*

\* cited by examiner

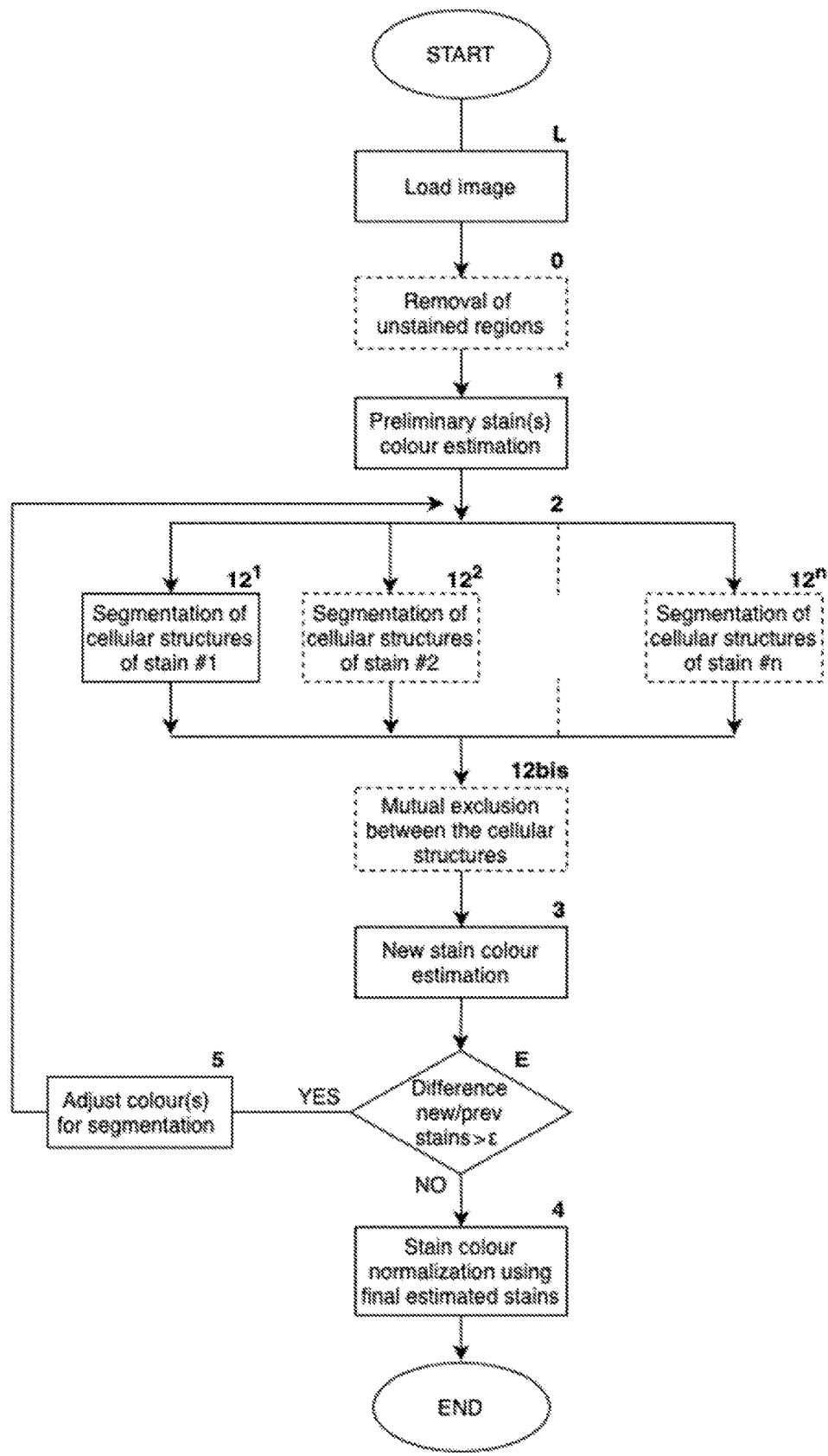
Figure

SYSTEM FOR PROCESSING AN IMAGE RELATING TO A HISTOLOGICAL TISSUE

CROSS REFERENCE TO THE RELATED APPLICATIONS

This application is the national phase entry of International Application No. PCT/IB2021/052119, filed on Mar. 15, 2021, which is based upon and claims priority to Italian Patent Application No. 102020000006148, filed on Mar. 24, 2020, the entire contents of which are incorporated herein by reference.

TECHNICAL FIELD

The present invention relates to the field of image processing systems in the medical field and in particular for the diagnosis conducted on histological tissues to be analyzed under the microscope.

BACKGROUND

As part of the histological analysis, a sample of biological tissue is extracted from a patient and reduced into very thin slices of the order of a few micrometers.

To facilitate the recognition of cells and organelles, a slice of tissue, hereinafter referred to as "histological tissue", is stained with one or more dyes and mounted on a slide to be analyzed under a microscope.

The distribution of staining of histological tissues presents a considerable variability due to various factors, such as the experience of the operator (laboratory technician) who carries out the cutting and sectioning of the sample, the degree of deterioration and exposure time to the dyes used and the type of scanner used to digitize the sample. Aging, for example, of the dye can lead to colors that deviate from the optimal coloring conditions of the sample.

A histological tissue can be stained with at least one dye. Generally no more than three dyes are used, but it is not excluded that in very rare cases a greater number may be used.

This variability in the staining of the histological preparation (e.g. too high/weak intensity, low contrast between cellular structures of interest, etc.) inevitably influences the diagnostic process of the pathologist both in terms of accuracy and time required for inspection and evaluation, of the sample. The expert anatomopathologist is able to compensate for these variability with experience. Less experienced (or young) pathologists and above all, automatic cell and organelle recognition systems can be greatly influenced by this variability to the point of leading to completely incorrect diagnoses.

Zarella et al. [An alternative reference space for H&E color normalization, 2017] proposed a histological image processing technique that is based exclusively on breast tissues stained with a single hematoxylin and eosin stain. The proposed technique is based on a sort of manual initialization, which involves a certain variability in the result and consumption of time.

If not specifically excluded in the detailed description below, what is described in this chapter is to be considered as an integral part of the detailed description..

SUMMARY

The objective of the present invention is to facilitate the analysis of histological tissues by improving the quality of the image presented to a technician or to an automatic quantitative imaging system in digital pathology.

The basic idea of the present invention is to acquire an RGB image of a histological tissue under investigation and to process the image in order to bring it back, in terms of color, to an image, predetermined or selected by a technician, reference corresponding to an analogous histological tissue. This is also known as "normalization".

More in detail, the processing method of the present invention comprises calculation of at least one first color relating to at least one first dye of the digital image, indicating this first color as the first "comparison color", segmentation of the image regions that express a hue in a hue neighborhood of the first "comparison color", thus obtaining a corresponding first area as the sum of all the closed regions obtained from the segmentation, calculation of a first "average color" in the segmented area in the previous step, if the first "average color" differs below a predetermined threshold from the "comparison color", then a correction factor is calculated and applied for each point of the image based on the hue of the point around the hue of the first "coloration" average "compared to the first" target average color" defined by a reference image, if, on the other hand, the first "average color" deviates beyond said predetermined threshold from the first "comparison color", then the first "average color" is set as the first "comparison color" and the whole process is repeated, that is resumed from segmentation.

In Zarella et al. there is no trace of the comparison between the "comparison staining" and the "average staining" obtained after segmentation, as a decisive element to stop the iterative process and perform normalization or to refine the segmentation by setting as a new "comparison staining" the "average color" obtained in the previous step.

The iterative process described here makes the present strategy highly reliable and repeatable even when the "comparison staining" is manually selected by an operator. In other words, the iterative process described here leads to convergence regardless of the initial conditions of the procedure.

The first "average color" is obtained on the basis of the points of the image that fall within a predetermined range of hues of the first "comparison color", for example purple, the second "average color" is obtained on the basis of the points of the images that fall into a predetermined neighborhood of hues of the second "comparison color", for example pink, etc.

For this purpose, when the sample has been colored with two or more dyes, then a first "comparison color" and a relative first "average color" are identified in relation to a first dye (stain), a second "comparison color" "And a related second" average color" for a second dye (stain), etc.

Each point of the image can be characterized by a triad of values in the RGB system, then the surroundings of the first, second, etc. "Comparison color" is defined by a 3D space around the point having as coordinates the RGB values of the comparison color. The comparison colors can be calculated automatically or manually set.

The segmentation procedure is also known in the literature with the Anglo-Saxon expression "region growing" in Italian which can be translated as "growth of the regions" and is a method based on a single pixel because it is initially necessary to select one or more "seeds" belonging to around the 3D indicated above. Said segmentation method examines the pixels that are in a hue neighborhood with respect to the "seeds" and determines whether they can be added to their region of belonging or region of interest.

Generally, the segmentation procedure takes place through image processing techniques in order to separate the objects of interest from the background. The chromatic characteristics of the colors identified in a previous step are used for the segmentation. A preferential way of segmentation is that described in WO2019229556A1 which, through an iterative and adaptive process, allows the automatic recognition of cellular structures in histological images. To carry out the segmentation, other known techniques of image processing can also be applied such as "thresholding", "region growing" and "active contours", known to those skilled in the art.

With the normalization it is expected to calculate a corrective factor to be applied at least to the points within each of the segmented areas. In other words, a deviation of the first color is forced towards a target color defined by the pathologist, a second deviation to the second color, etc.

Image processing and related normalization can also be performed in other color spaces in addition to RGB, such as LAB, CMYK, OD, HSV, etc.

When the histological tissue is treated with two or more dyes, then the digital image includes as many colors, the method described above is applied as it is, realizing as many corrective factors as there are colors, applying independent normalizations at least in the respective areas: first area, second area, etc.

According to a preferred variant of the invention, in the presence of two or more dyes, the first, second, etc. "Comparison color" is calculated through a clustering operation on the color hues of the image. The clustering procedure is known in the literature and can be performed with various techniques such as "mean-shift clustering", "DBSCAN", "k-means", "agglomerative hierarchical clustering", known to the skilled in the art.

Also in this case, i.e. in the presence of two or more colorants, it is possible to manually select the first, second, etc. "Comparison color" necessary to perform the segmentations and the subsequent calculation of the first, second, etc. "Average color".

According to a further preferred variant of the invention, before calculating the first, second, etc. "Average color", the intersection portions between the areas obtained for as many segmentations are excluded, ie those portions of the digital image that belong simultaneously to two or more areas defined by respective segmentations conducted on respective two or more colors.

According to a further preferred variant of the invention, which depends on the previous one, the intersection portions are also normalized, for example by applying all the normalizations of the areas to which they belong simultaneously, for example area one and area two, or the area one and area three, area two and area three or area one, two and three.

According to a further preferred variant of the invention, the digital image is previously subjected to a prior masking of the areas of the digital image corresponding to portions of histological tissue that have not absorbed any dye, generally white areas, so as to obtain a first "comparison color" quite reliable.

The dependent claims describe preferred variants of the invention, forming an integral part of this description.

BRIEF DESCRIPTION OF THE DRAWINGS

Further objects and advantages of the present invention will become clear from the following detailed description of an example of its embodiment (and its variants) and from the annexed drawings given purely for explanatory and non-limiting purposes, in which:

The FIGURE shows an example of a flow chart relating to a preferred variant of the method object of the present invention.

The same reference numbers and letters in the FIGURE identify the same elements or components.

The steps considered optional are reported in blocks with a dashed outline.

In the context of this description, the term "second" component does not imply the presence of a "first" component. These terms are in fact used as labels to improve clarity and should not be understood in a limiting way.

The elements and features illustrated in the various preferred embodiments, including the drawings, can be combined with each other without however departing from the scope of this application as described below.

DETAILED DESCRIPTION OF THE EMBODIMENTS

The FIGURE shows an example of a flow chart according to the method of the present invention, in particular the steps to be carried out in the same order:

(Step 1) calculation of at least one first color relating to at least one first color of the digital image, indicating this first color as the first "comparison color", (Step 2/12[1]) segmentation of the regions of the image that express a hue around the first "comparison color" obtaining a corresponding first area as the sum of all the closed regions obtained from the segmentation, (Step 3) calculation of a first "average color" of the segmented area in the previous step, if this first "average color" differs below a certain threshold from the first "comparison color", then (Step 4) a correction factor is calculated and applied to each point of the image based on the hue of the point around the first "average color" compared to a first reference "average target color", if, on the other hand, the first "average color" deviates beyond said predetermined threshold from the first "comparison color", then (Step 5) the first "average color" becomes the first "comparison color" and resumes from segmentation (Step 2).

Step 5 is only performed if the "average color" obtained after segmentation deviates greatly, ie beyond a predetermined epsilon threshold compared to the "comparison color" obtained in Step 1.

The flow chart shows a clearly implicit Step L, which involves the acquisition and loading of the digital image. This acquisition can be carried out using various known methods, from a local or remote memory medium.

Optionally, a first digital image processing is performed (Step 0), eliminating all areas of the digital image corresponding to portions of histological tissue that have not absorbed any dye. This operation is called "masking" in jargon.

When exiting loop 2 – 3 – 5, it is possible in Step 4 to perform the normalization of the digital image.

In particular, on the basis of the average color of each stain and on the basis of a respective target color of the reference digital image, a correction factor or deviation is calculated. Therefore, by normalization we mean the fact of applying the corrective factor to the digital image to bring back the color given by the stain to the target color of the reference image.

This corrective factor or deviation is therefore applied to the points of the image belonging to the same stain.

Preferably, for the calculation of each correction factor, the concentration distribution of a specific stain of the digital image is compared with the concentration distribution of the same stain in a reference image. The procedure for calculating the correction factor is repeated for each color/dye present within the digital image.

When the digital image includes two or more colors, then in Step 1 the colors of each stain are calculated, ie the first "comparison color", the second "comparison color", etc.

Since in Step 1 two or more colors related to respective two or more stains present in the histological image are identified, then Step 2 is divided into as many branches $12^1$, $12^2$, $12^3$, ... as many colors are identified. Therefore, many segmentations are performed, identifying as many areas each with respect to one of the stains identified.

Since a cellular structure is colored with the same stain, that is, with the same dye, then speaking of a segmented area or a cellular structure is equivalent. For this reason, in the FIGURE, steps $12^1$, $12^2$, etc. refer to cellular structures isolated by segmentation.

Preferably, in optional step 12bis, the intersection areas are eliminated. Step 12bis makes sense when there are two or more stains.

Also for step 12bis, the exclusion of the intersections of the areas corresponds to the exclusion of intersections between cellular structures.

For each area, which includes the closed areas of the same color, a first "average color" is recalculated and, as reported in the previous description, in Step E, this "average color" is compared with the "comparison color" calculated previously, for example to Step 1, or to Step 3 of the iteration immediately preceding the current one.

Evidently, the comparisons for the different stains occur independently and in parallel with each other.

Step 5 consists of an update of the coloration estimate in case the current "average coloration" deviates a lot, ie beyond epsilon, from the "comparison coloration" to define the segmentation at step (s) $12^1$, $12^2$, etc .

When there are two or more stains, normalization is performed independently on each stain, using the relative correction factor.

Therefore, the present invention can be applied independently on one or more stains, remembering only that in the presence of more stains the intersection areas are excluded for the estimation of the "average color". As these areas, being altered by more stains, they would invalidate the estimate of the mean staining.

However, the intersection areas are preferably normalized with all the corrective factors of all the areas to which they belong or by means of relative linear combinations. For example, if a cell structure is recognized simultaneously in stain #1 and #3, then the corrective factor relative to stain #1 and #3 will be applied for those pixels.

The present invention can be advantageously carried out by means of a computer program which comprises coding means for carrying out one or more steps of the method, when this program is executed on a computer. Therefore, it is intended that the scope of protection extends to said computer program and further to computer readable means comprising a recorded message, said computer readable means comprising program coding means for carrying out one or more steps of the method, when said program is run on a computer.

Implementation variants of the described non-limiting example are possible, without however departing from the scope of protection of the present invention, including all the equivalent embodiments for a person skilled in the art, to the content of the claims.

From the above description, the person skilled in the art is able to realize the object of the invention without introducing further construction details.

The invention claimed is:

1. A method for processing a digital image relating to a histological tissue that has been stained with one or more colors to vary a staining color of the digital image by forcing it towards a "target average color" that is an average of the same staining color of a digital reference image, the method includes the following steps:
   Step 1: calculation of a "comparison color" of the staining color of the digital image,
   Step 2: determination of an area consisting of pixels in the digital image that have a color within a first threshold of the "comparison color",
   Step 3: calculation of an "average color" of the area,
   Step 4: if this "average color" is within a second threshold of the "comparison color", then calculation and application of a correction factor for each pixel of the digital image based on the comparison of the color of said each pixel with the "target average color" of the digital reference image,
   Step 5: otherwise, the "average color" becomes the "comparison color" and restarts from Step 2.

2. The method according to claim 1, wherein the "target average color" is either set manually or calculated by applying Step 1 through Step 3 to the reference digital image.

3. The method according claim 2, further comprising a step (Step 0) before Step 1 that masks the areas of the digital image corresponding to portions of histological tissue that have not absorbed any dye and Step 1 – Step 5 are carried out on the masked digital image.

4. The method according to claim 2, wherein, when the digital image has more than one staining color, executes Step 1 through Step 5 for each of the staining colors that is different from the staining color of claim 1 separately, wherein, each of the staining colors has a respective "target average color".

5. The method according to claim 1, wherein, when the digital image has more than one staining color, executes Step 1 through Step 5 for each of the staining colors that is different from the staining color of claim 1 separately, wherein, each of the staining colors has a respective "target average color".

6. The method according to claim 5, further comprising a step (Step 12bis) between Step 2 and Step 3 of exclusion of all portions of the digital image given by intersection between the areas corresponding to the n staining colors that are each obtained in Step 2, resulting in revised areas, one per staining color, that do not overlap and are subsequently used as the respective area in Step 3.

7. The method according to claim 6, wherein the portions excluded from the digital image are normalized with all the correction factors of all the areas to which they belong simultaneously or by means of relative linear combinations.

8. The method according to claim 7, further comprising a step (Step 0) before Step 1 that masks the areas of the digital image corresponding to portions of histological tissue that have not absorbed any dye and Step 1 – Step 5 are carried out on the masked digital image.

9. The method according to claim 5, further comprising a step (Step 0) before Step 1 that masks the areas of the digital image corresponding to portions of histological tissue that have not absorbed any dye and Step 1 – Step 5 are carried out on the masked digital image.

10. The method according to claim 6, further comprising a step (Step 0) before Step 1 that masks the areas of the digital image corresponding to portions of histological tissue that have not absorbed any dye and Step 1 – Step 5 are carried out on the masked digital image.

11. The method according to claim 1, further comprising a step (Step 0) before Step 1 that masks the areas of the digital image corresponding to portions of histological tissue that have not absorbed any dye and Step 1 – Step 5 are carried out on the masked digital image.

12. The method according to claim 11, wherein the portions excluded from the digital image are normalized with all the correction factors of all the areas to which they belong simultaneously or by means of relative linear combinations.

13. The method according claim 1, wherein the target "average color" is either set manually or by applying Step 1 through Step 3 to the reference digital image.

14. The method according to claim 11, further comprising a step (Step 0) before Step 1 that masks the areas of the digital image corresponding to portions of histological tissue that have not absorbed any dye and Step 1 – Step 5 are carried out on the masked digital image.

15. A processing system comprising:
a processor,
a memory coupled to the processor, and
processor-executable instructions stored in the memory, wherein the processor-executable instructions, when executed by the processor, carry out the method of claim 1.

16. A non-transitory, computer readable storage medium having stored therein processor-executable instructions which, when executed by the processor, carry out the method of claim 1.

\* \* \* \* \*